(12) United States Patent
Rossi et al.

(10) Patent No.: US 6,239,767 B1
(45) Date of Patent: *May 29, 2001

(54) UNIVERSAL COMMUNICATIONS SYSTEM FOR SPACE APPLICATIONS

(75) Inventors: David A. Rossi, Washington, DC (US); Clark Thompson, Webster; John M. Lounge, Seabrook, both of TX (US)

(73) Assignee: Spacehab, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,343

(22) Filed: Nov. 8, 1999

Related U.S. Application Data

(63) Continuation-in-part of application No. 09/163,252, filed on Sep. 30, 1998, now Pat. No. 5,982,341, which is a continuation of application No. 08/666,729, filed on Jun. 18, 1996, now Pat. No. 5,828,347.

(51) Int. Cl.[7] ..................................................... H01Q 3/02
(52) U.S. Cl. .................................... 343/882; 343/DIG. 2; 244/158 R
(58) Field of Search .................................... 343/882, 915, 343/916, DIG. 2; 455/12.1, 13.1; 244/158 R, 159

(56) References Cited

U.S. PATENT DOCUMENTS

| 4,738,304 | * | 4/1988 | Chalmers et al. | 165/13 |
|---|---|---|---|---|
| 5,422,647 | * | 6/1995 | Hirshfield et al. | 342/354 |
| 5,644,322 | * | 7/1997 | Hayes et al. | 343/915 |
| 5,806,799 | * | 9/1998 | Lounge | 244/158 R |
| 5,828,347 | * | 10/1998 | Rossi et al. | 343/882 |
| 5,848,766 | * | 12/1998 | Thompton | 244/158 R |
| 5,982,341 | * | 11/1999 | Rossi et al. | 343/882 |

* cited by examiner

Primary Examiner—Tan Ho
(74) Attorney, Agent, or Firm—Rossi & Associates

(57) ABSTRACT

A secondary universal communication system enables dedicated and independent communications capability between space vehicle payload elements and ground based communications networks. The system may either utilize existing communications satellites as an intermediate network to provide continuous communications with payload elements, regardless of orientation or configuration of the space vehicle, or may communicate directly with ground stations via down link capability. The system has a navigation system and an inertial measurement system to provide antenna pointing and tracking capability to actively track satellites. The secondary universal communications system can provide supplemental and independent communications capacity to the space vehicle's primary communication system.

3 Claims, 8 Drawing Sheets

UNIVERSAL COMMUNICATIONS SYSTEM FOR SPACE APPLICATIONS

CROSS REFERENCE TO RELATED APPLICATIONS

This application is a continuation-in-part-application and claims priority from U.S. patent application Ser. No. 09/163,252, filed Sep. 30, 1998, now U.S. Pat. No. 5,982,341 allowed on Apr. 12, 1999, which is a continuation of U.S. patent application Ser. No. 08/666,729, filed Jun. 18, 1996, now issued as U.S. Pat. No. 5,828,347.

FIELD OF THE INVENTION

The invention relates in general to a secondary communication and navigation system, which provides positional information, communication between space vehicles, and communication between space vehicles and ground stations. More specifically, the invention relates to a communications system integral to a payload module for a space vehicle which provides dedicated and independent communications for its payload elements and offers satellite tracking capability for antenna pointing.

BACKGROUND

There has been a movement in recent years to privatize access to space and to develop commercial space systems. In this regard, various privately owned commercial systems have been proposed for implementation with space vehicles, for example the National Space Transportation System (NSTS) Orbiter, the Mir Space Station, and the planned International Space Station (ISS). Recently, the National Aeronautics and Space Administration has relinquished control of NSTS operations to a coalition of private companies called the United Space Alliance. In addition, the ISS is being deployed and constructed by an international consortium of government and private entities.

One such successful implementation of a commercial space venture was the successful development of the SPACEHAB module by SPACEHAB Inc. The SPACEHAB module, as described in U.S. Pat. No. 4,867,395, the contents of which are incorporated herein by reference, includes flat end caps and a flat top panel that permit useful payload items to be attached to the outside of the module in addition to being carried within the module. The SPACEHAB module can be readily co-manifested with other payloads and has been successfully flown on several NSTS Orbiter missions. In order to increase the pressurized volume of the basic SPACEHAB module, a plurality of the basic modules can be coupled together to form a variable length mission-configurable module, which was successfully flown on resupply missions to the Mir Space Station.

One drawback to offering commercial access to space via privately owned and operated payload modules, is the inability of payload customers to maintain constant direct communication with payloads due to the inherent limitations of communicating through the primary communications system of a space vehicle. Payload users need to communicate with payload elements and their own mission specialists working within the module continuously, without waiting in a cue for air time from the main communication system. Another drawback is the inability of commercial customers to obtain continuous positional information to accurately track satellites during each orbit for antenna pointing purposes without reliance on externally provided navigation information. Many existing space vehicles utilize antiquated main communication systems which were developed to interface with the existing communication system of a national space agency. For example, the main communication of the NSTS Orbiter was developed to communicate with NASA's existing system during the 1970's. These primitive communication systems have limited bandwidths and capabilities, and they were not designed for compatibility with the Internet and modem microcomputer hardware and software.

It is therefore an object of the present invention to provide a universal communication system which permits continuous communication with a payload element and with mission specialists, and permits payload users to communicate directly with their payloads, without using the main communication system of a space vehicle. It is another object of the invention to provide a universal communication system that will provide satellite tracking capability for antenna pointing. It is another object of the present invention to utilize standard hardware and software interfaces to provide reliable bi-directional Internet compatible data communications that are responsive to payload user requirements.

SUMMARY OF THE INVENTION

The present invention, the SPACEHAB Universal Communication System (SHUCS), provides a secondary universal communications system that enables dedicated and independent communications capability between payload elements located in a space vehicle and ground based communications networks. SHUCS operates without utilization of the infrastructure from the main communication system of a space vehicle. Because SHUCS does not rely on the main communication system of the space vehicle, payload users are not subjected to the air time priorities of the space vehicle's main communication system. The system may either utilize existing communications satellites as an intermediate network to communicate with a ground station or may communicate directly with a ground station via down link capability. In addition, the universal communications system can provide supplemental and independent communications and navigation capacity to a space vehicle's primary communication system.

In one embodiment of the present invention, a Versatile On-orbit Integrated Communication Equipment (VOICE), the basic communication capabilities of SHUCS are supplemented by a satellite tracking navigation system. The VOICE navigation system provides antenna pointing and tracking capability to actively track communications satellites. Using standard hardware and software interfaces, SHUCS provides reliable and platform independent, bi-directional, Internet compatible, data communications that are responsive to payload user requirements.

The secondary universal communication system includes an external antenna unit, at least one payload element located with the space vehicle, an internal antenna unit coupled to the external antenna unit and to the payload element. A transmitter/receiver unit within the internal antenna unit provides direct communication of data between the payload element and at least one of a ground station, another orbiting space vehicle, and an orbiting station via the external antenna unit without utilizing the main communication system of the space vehicle. The data communicated by the transmitter/receiver unit includes voice, image, and video data. The system may fixer include an antenna directional controlling device and a navigation system. The navigation system actively tracks a system of satellites, the CPU selects an optimal satellite signal, and the CPU directs the antenna directional controlling means to point the antenna towards the optimal satellite signal. The external antenna may also include a radiator assembly to dissipate the heat generated by the CPU, high powered amplifier, remote transmitting unit, and other devices mounted on the external unit.

BRIEF DESCRIPTION OF THE DRAWINGS

The invention will be described with reference to the accompanying drawings, wherein.

DETAILED DESCRIPTION OF THE PREFERRED EMBODIMENTS

Figure 6:
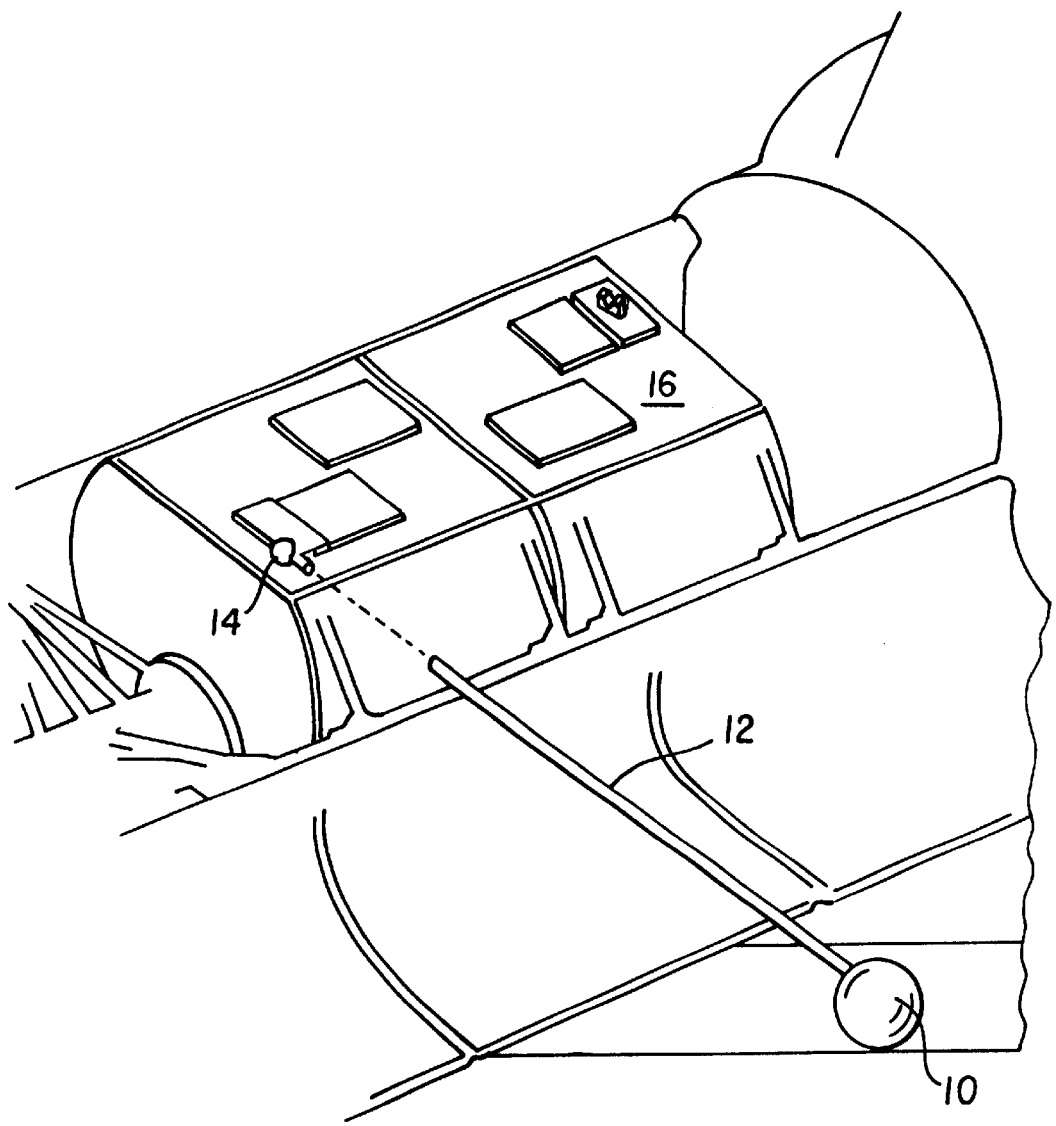
FIG. 6 illustrates the antenna and boom assembly being jettisoned.

FIGS. 1–4 respectively illustrate isometric, side, top and front views of the communication system in accordance with the invention in both a stowed position and an extended position shown in phantom. The communication system includes an antenna structure 10 (for example a phased array antenna) rotatably coupled to a first end of a boom structure 12 and a universal mounting assembly 14 coupled to the second end of the boom structure 12 and to a payload module 16. In the preferred implementation of the invention, the payload module 16 is a SPACEHAB dual module incorporating a flat top design, which enables the antenna structure 10 to be properly stowed within the closed bay configuration indicated by the hatched line illustrated in FIG. 4. The boom structure 12 is also preferably mounted to the universal mounting assembly 14 via explosive bolts or any other automatic decoupling mechanism 15, thereby permitting the boom structure 12 to be jettisoned (as illustrated in FIG. 6) in emergency situations where the antenna structure 10 and boom structure 12 cannot be properly stowed.

Figure 1:
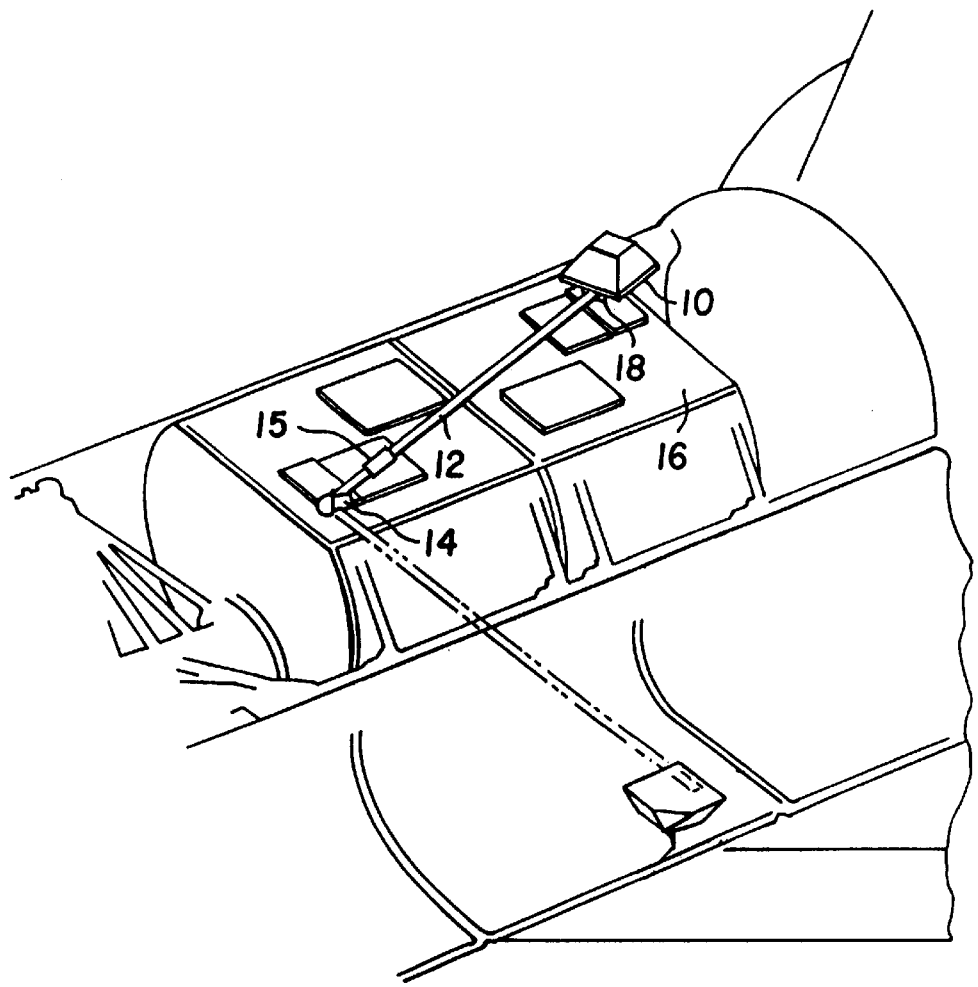
FIG. 1 is an isometric view of a communication system in accordance with the invention in a stowed position mounted atop a flat topped pressurized payload installed in the cargo bay of an NSTS Orbiter.
Figure 2:
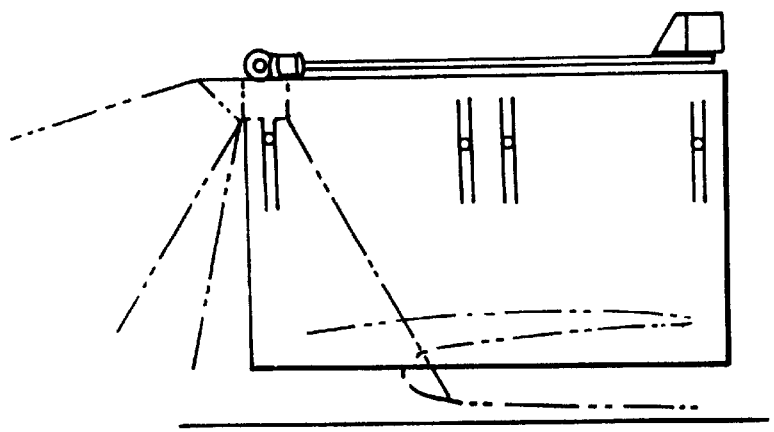
FIG. 2 is a side view of a communication system in accordance with the invention in a stowed position mounted atop a flat topped pressurized payload installed in the cargo bay of an NSTS Orbiter.
Figure 3:
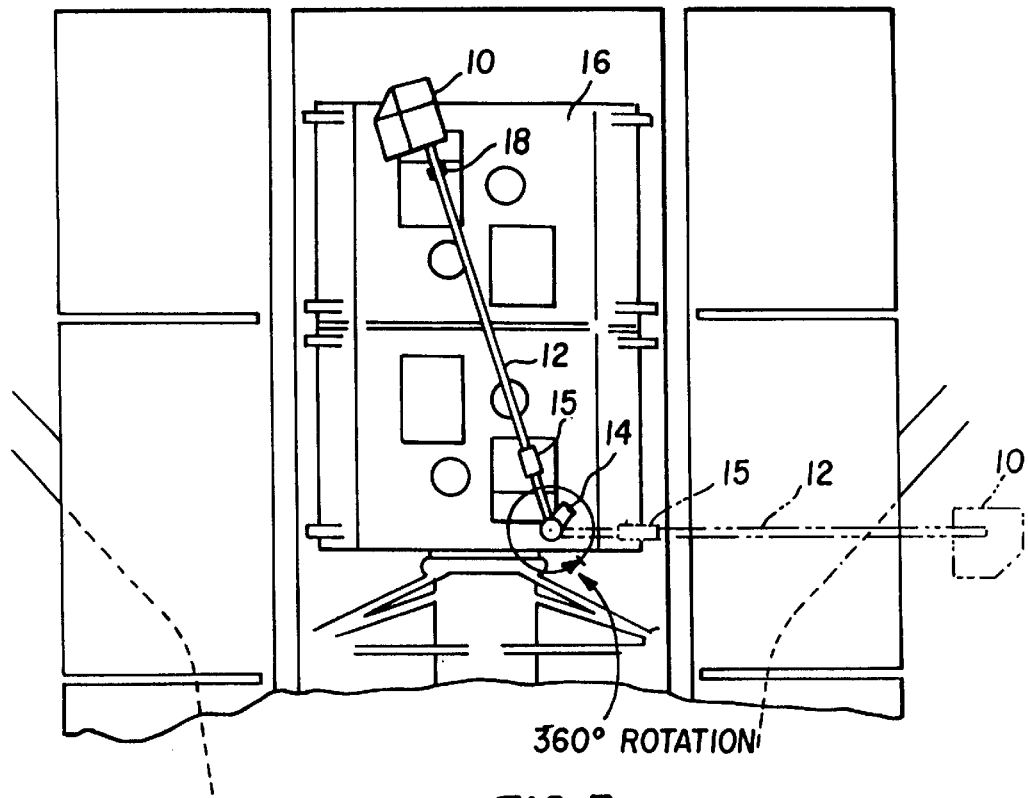
FIG. 3 is a front view of a communication system in accordance with the invention in a stowed position mounted atop a flat topped pressurized payload installed in the cargo bay of an NSTS Orbiter.
Figure 4:
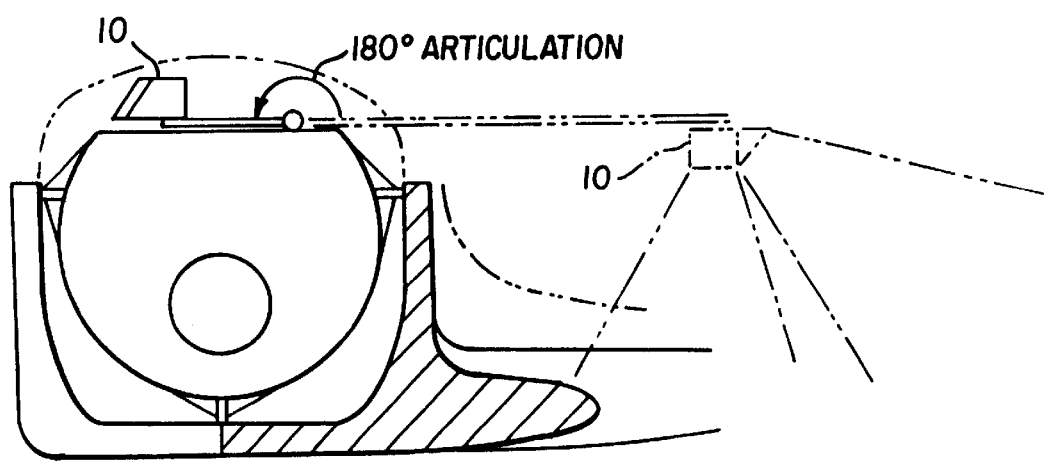
FIG. 4 is a front view of a communication system in accordance with the invention in a stowed position mounted atop a flat topped pressurized payload installed in the cargo bay of an NSTS Orbiter.
Figure 5:
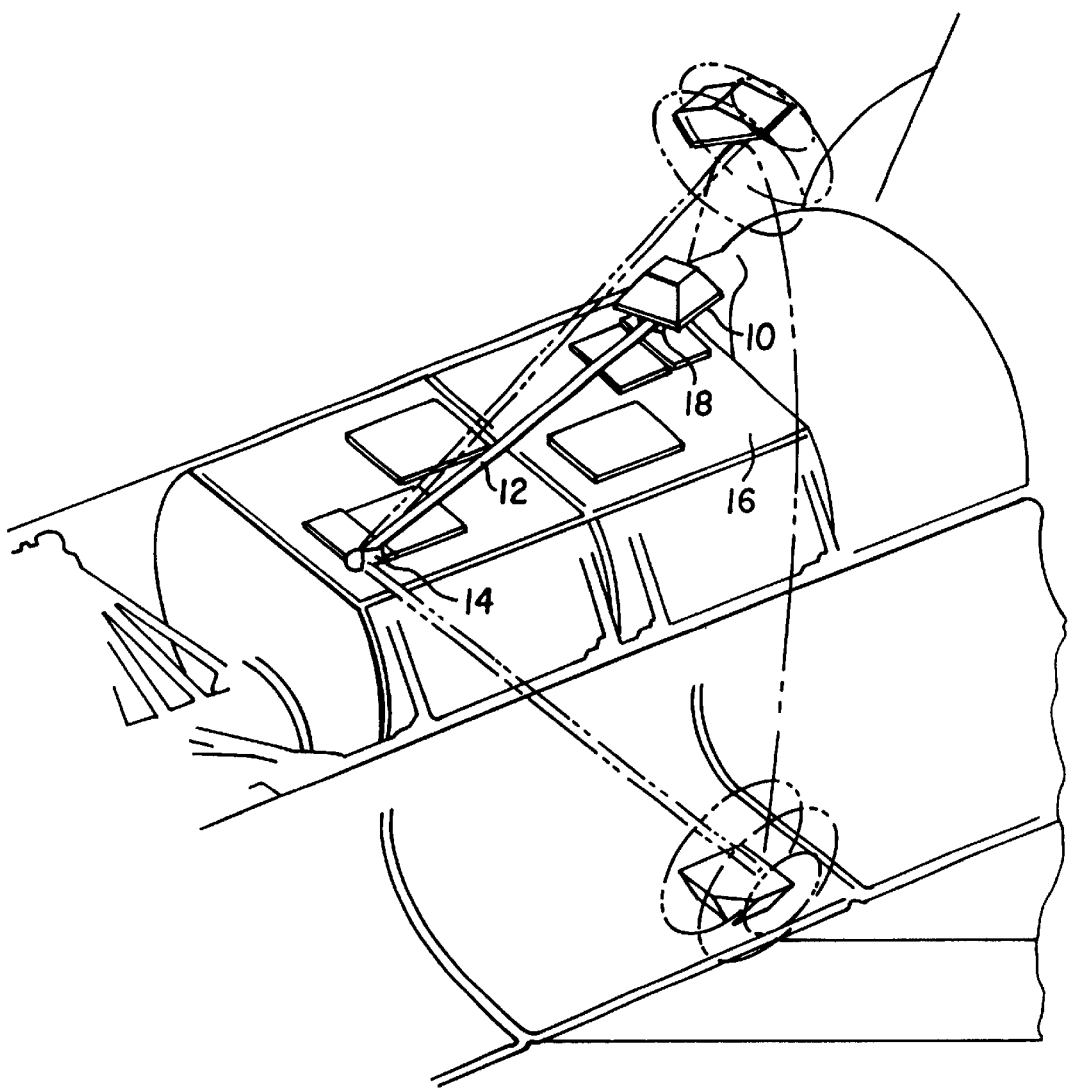
FIG. 5 is an isometric view illustrating the ability to rotate the antenna about the long axis of the boom.

The universal mounting assembly 14 includes electrical motors and gear assemblies that permit substantially 360 degrees of rotation of the boom structure 12 in a plane substantially parallel to the flat top of the payload 16 as viewed in FIG. 3, and substantially 180 degrees of articulated motion of the boom structure 12 as viewed in FIG. 4. Accordingly, the boom structure 12 is fully rotatable and can be articulated to allow the antenna structure 10 to be located in any desired position above the cargo bay of the NSTS Orbiter. In addition, the antenna structure 10 is coupled to the boom structure 12 by a rotating and articulating mounting 18 that permits the antenna structure 10 to be rotated substantially 360 degrees about the axis of the boom structure as illustrated in FIG. 5 and to articulated substantially 180 degrees as illustrated in phantom in FIGS. 2 and 4.

Figure 7:
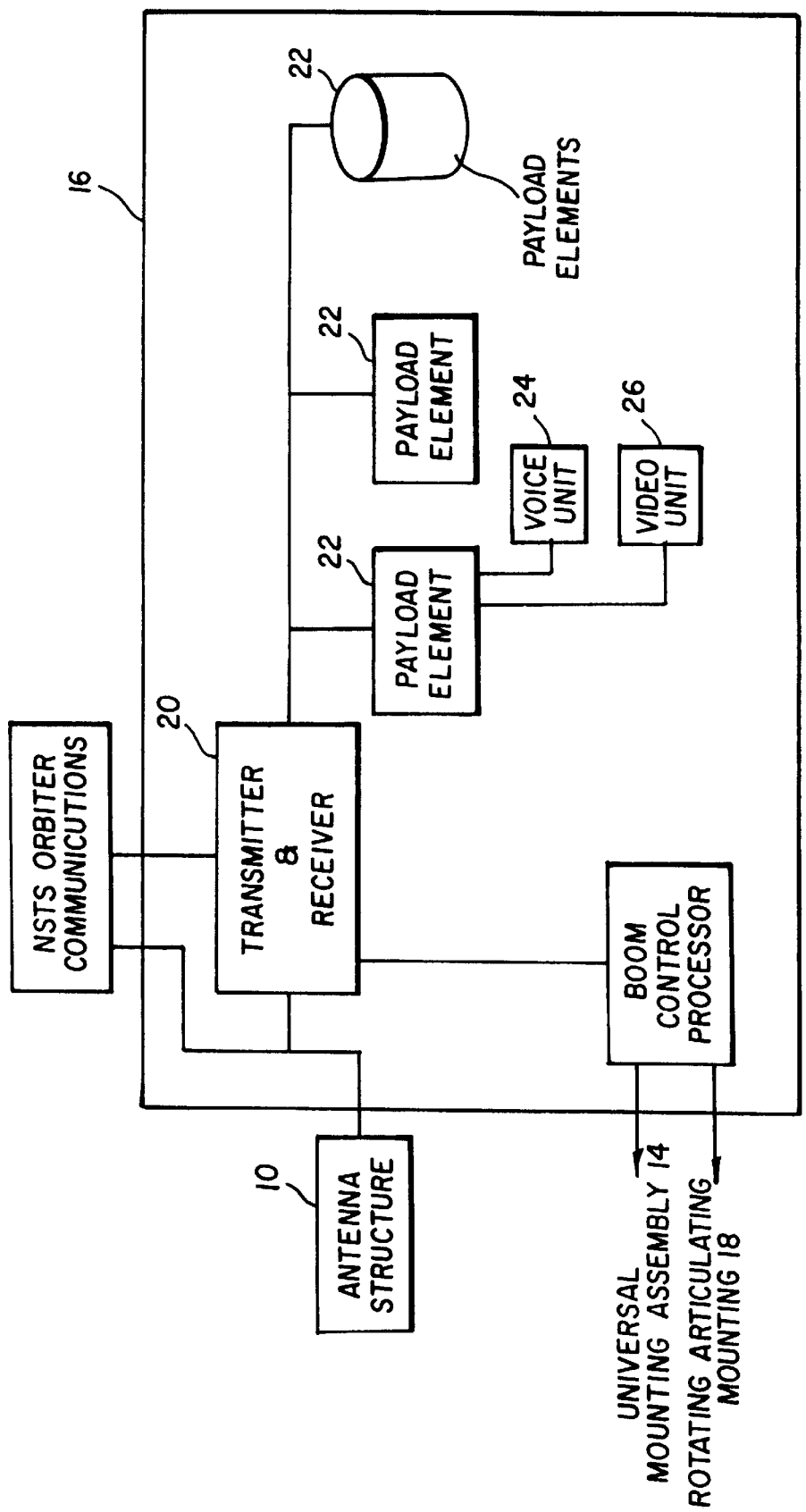
FIG. 7 is a schematic block diagram view of the coupling of the antenna structure to various elements within the payload module.

FIG. 7 illustrates the connection of the antenna structure 10 to various experiments and devices within the payload module 16. As shown in FIG. 7, the antenna structure 10 is coupled to a transmitter/receiver unit 20, which in turn has data lines coupled to various payload elements 22. The payload elements 22 may include individual customer experiments, thereby permitting customers to directly communicate with their experiments, monitoring systems for the payload module 16, thereby permitting the module operator to directly monitor module function, or any other types of payloads requiring communication capability. In addition, a voice unit 24 and a video unit 26 are preferably provided to permit direct audio and video links with mission specialists working within the payload module 16. Signals from the transmitter/receiver unit 20 may also be supplied to a boom control processor 28, which monitors various signal characteristics of transmitted and received signals. Based on the monitored signal characteristics, the boom control processor 28 sends signals to the motors of the universal mounting assembly 14 and the rotating articulating mounting 18 to properly position the antenna structure 10 for optimum results. Finally, a signal line from the NSTS Orbiter's communication system can be coupled to the transmitter/ receiver unit 20 or directly to the antenna structure 10 to permit the communication system to provide supplemental and independent communications capacity to the NSTS Orbiter.

As is readily apparent, the present invention is also suitable for communication with a payload located on an orbiting space vehicle, for example the ISS. The SHUCS provides an independent secondary communication system which enables payload users to communicate directly with their payloads, including payload elements and their own mission specialists, while they are on board a space vehicle.

Figure 8:
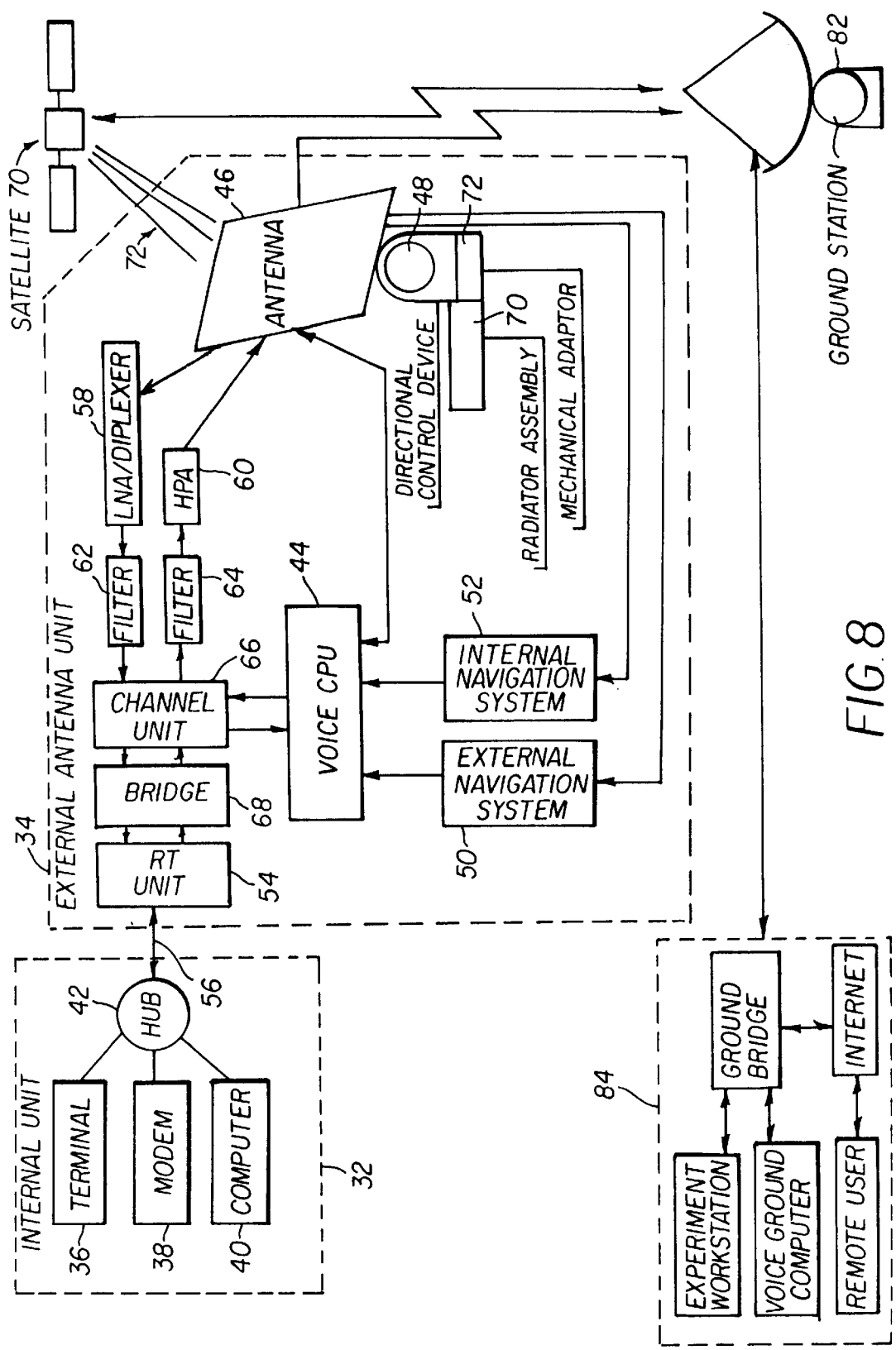
FIG. 8 is a schematic block diagram of a preferred embodiment of the VOICE system interfacing with systems on the ground, a satellite network, and a ground station communication network.

FIG. 8 is a schematic block diagram of a VOICE system in accordance with the invention, wherein the basic capabilities of the SHUCS are supplemented by a navigation system to provide antenna pointing and tracking capability to actively track communications satellites. The VOICE system consists of an internal unit 32 and an external antenna unit 34. The internal unit 32 is coupled to a, and the external antenna unit 34 is mounted to an external location on a space vehicle. The internal unit 32 has three primary components: a terminal 36, a modem 38, and a computer 40; and these components are linked together by a central hub 42. The external antenna unit 34 has a central processing unit (CPU) 44 which controls its primary components including: an antenna 46, a directional control device 48, an external navigation system 50, an internal navigation system 52, and a remote transmitting (RT) unit 54. The internal unit 32 and the external unit 34 are interconnected by an interconnection device 56, which may be any type of suitable wireless or hard wired connection device.

The internal unit 32 is preferably sized to fit in one half of a SPACEHAB module locker, which is equivalent to a mid-deck locker. Standard commercially available hardware may be used for the internal unit 32. In a preferred embodiment, the three primary components of the internal unit 32 are: a LYNXX Imnarsat B terminal 36, an RT modem 38, and a PC/104 computer 40; which are interconnected by an Ethernet hub 42. Certain hardware and software modifications to the standard units are necessary for a space flight environment. The power source of the LYNXX terminal 36 was modified to make it compatible with the 28 VDC power supply on the ISS. Preferably, the internal unit 32 of the VOICE system utilizes a standard telephone handset, and the PC/104 computer 40 contains software to automate the telephone calling processes. The telephone has an off hook switch and tri-colored LED which allows terminal reset without handset manipulation. The tricolored LED indicates whether a call is up; down, no satellite acquired; or ready for use, satellite acquired, no call up.

The external antenna unit 34 is configured to be attached to an external location on a space vehicle 74. For example, the external antenna unit 34 is mounted outside of the Russian Segment of the International Space Station. Standard commercially available hardware which has been modified for a space flight environment may be used for the components of the external antenna unit 34. Preferably, the external antenna unit 34 consists of an L-band antenna 46, a directional control device pan and tilt unit (PTU) 48, a global positioning system (GPS) external navigation system 50, an internal navigation system (INS) 52, a low noise amplifier (LNA)/diplexer 58, a high powered amplifier (HPA) 60, filters 62 64, a LYNXX terminal channel unit 66, a bridge 68 and a LYNXX remote transmitting (RT) unit 60; all of which are controlled by the VOICE CPU 44. Preferably, the GPS 50 is a TANS Vector 1 GPS system with four receiving antennas, and the PTU 48 utilizes iridium Honeywell actuators.

Most applications that utilize the Imnarsat B satellite communication network are stationary or slow moving. As a result, additional firmware and software were added to the LYNXX channel unit 66 to provide a mechanism for tracking a satellite 70 and compensating for Doppler shifts which occur as a rapidly moving space vehicle moves towards and then away from a satellite beam 72. The CPU 44 is the VOICE system controller, and it receives highly accurate time and inertial navigation data from the GPS 50 and INS 52, corrects this data for Doppler shifts, and then utilizes this data to steer the antenna towards a communication satellite beam 72. The GPS 50 and INS 52 provide directional information for antenna pointing and the capability to actively track a satellite 70. Preferably, the GPS element 50 is modified to allow the system to work in an orbital environment and provide extremely accurate time and inertial navigation data for use in the Doppler compensation calculations. The GPS 50 and INS 52 use the same platform to significantly simplify antenna pointing calculations between the GPS 50 and INS 52. The LNA/diplexer 58 receives and filters incoming antenna signal data prior to directing it through the channel unit 66 and into the CPU 44. The HPA 60 amplifies outgoing data from the VOICE CPU 44, prior to broadcasting a signal from the antenna 46. Preferably, the LYNXX RT unit 54 is modified for a space environment. The RT unit 54 allows the terminal 36 of the internal unit 32 to be operated up to 500 feet away from the external unit 34 without reducing gain or increasing frequency distortion.

Figure 9:
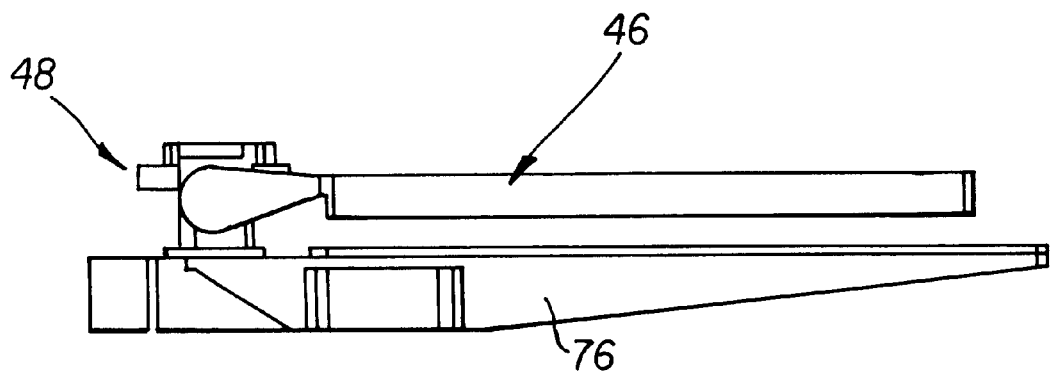
FIG. 9 is a side view of a VOICE external antenna in accordance with a preferred embodiment of the invention.
Figure 10:
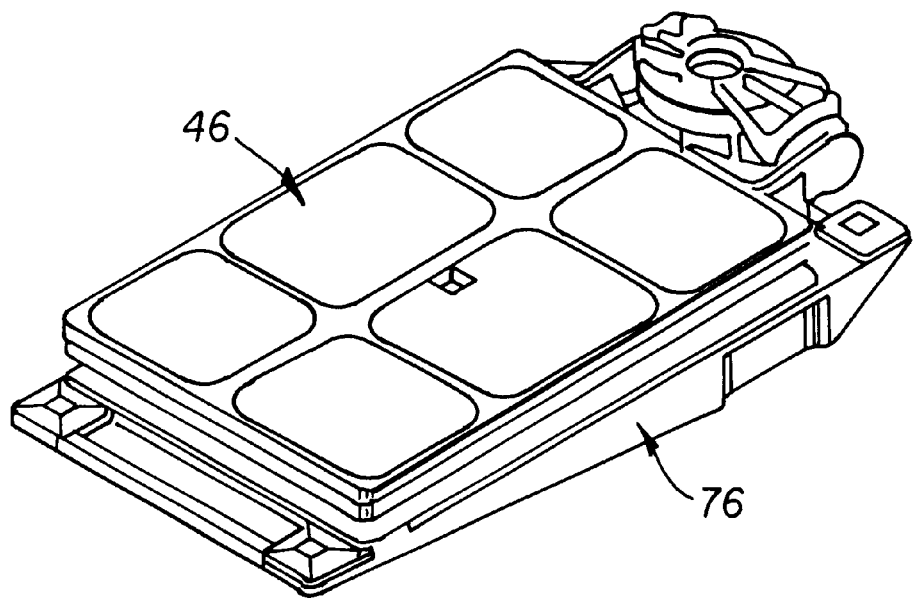
FIG. 10 is an isometric view of the VOICE antenna illustrated in FIG. 9.
Figure 11:
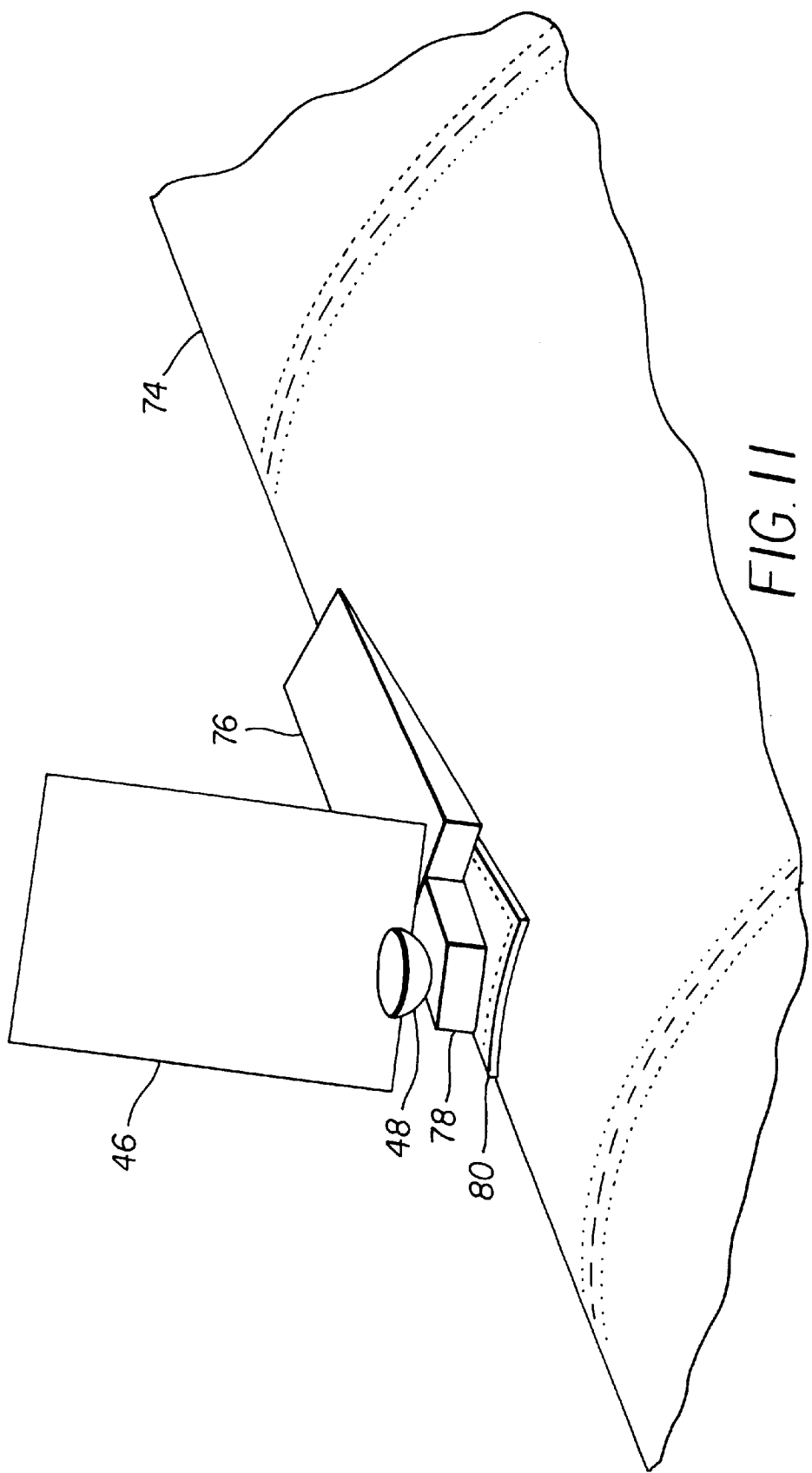
FIG. 11 is an isometric view of the VOICE external antenna mounted to the external of a space vehicle with the antenna extended.

FIGS. 9–11 illustrate various views of the external antenna unit 34 for the VOICE system deployed on the exterior of a space vehicle 74. Preferably, the antenna unit 34 utilizes an L-band antenna 46 designed for the space environment which is attached to a space rated PTU 48 which allows the antenna to be pointed towards a satellite beam 72. Preferably, the external antenna unit 34 is equipped with a radiator assembly 76, which dissipates the heat generated by the CPU 44, RT unit 54, HPA 60 and other equipment. The external antenna unit 34 is sized to meet payload bay dynamic envelope requirements for storage inside the a space vehicle during intra-vehicular activities (IVA) and also for convenient installation on the external of a space vehicle during extra-vehicular activities (EVA). The external antenna unit mechanical adapter 78 attaches to a module mechanical adapter 80 located at the designated mounting location. This device is EVA compatible, to facilitate installation by the EVA crew. The interconnection device 56 connects the internal unit 32 to the external unit 34, and preferably it is a cable which exits through a pass though plate in the external wall of a space vehicle. Preferably, the cable 56 is a three cable conductor, and it connects the two units 32 34 to provide power, data, and a radio frequency (RF) path to transmit and receive signals.

In a preferred embodiment, SHUCS allows payload users to interact with their payload during the entire mission via the commercial Inmarsat geosynchronous orbit (GEO) satellite constellation 70 and the Comsat ground station communication network 82 operating in the L-Band of the radio frequency. Preferably, SHUCS provides the standard Inmarsat B services including digital voice rate calls at 16 kbps, STU-111 secure voice at 9.6 kbps, fax, and high speed data calls over one to four 64 kbps uplink downlink channels. SHUCS allows remote payload operations including file transfer, commanding, uplink and downlink fax, secure voice communications, and TCP/IP addressing through a secure Intranet network. The system can interface with a standard DTMF telephone, standard PC computer connected to the Internet, Group III Fax, RS232 data, RS422/499 data, V.35HSD, and protocols that use 10 Base T Ethernet. Payload users may operate the VOICE system either via their mission specialists on board a space vehicle or as a remote user on the ground 84.

The operation of a preferred embodiment of the VOICE system will now be described. First, the system automatically initializes and starts down linking status through the downlink. The GPS system 50 calculates a position and the antenna 46 is aimed at a satellite 70. The antenna 46 locks onto the satellite beam 72 and starts gain tracking. A high-speed call is placed to the ground. Uplink and downlink telemetry/commands are handled by a high speed data link. If the link is not needed, a command is sent through the high-speed data call to drop the call for a certain length of time. After the commanded length of time has passed, the system places a high-speed call and the process repeats. If a crew member wants to make a call, they push the call button on the internal unit 32. The front panel LED will turn yellow. When the LED turns green, the crew member dials the phone number of the call. After the call is finished and the parties have hung up, the system will automatically go back into the high-speed data call mode. While the calls are being made, the antenna continuously tracks the satellite. If the VOICE system moves out of view or loses communication with the satellite 70, it repoints to a new satellite 70 and reacquires a signal. Operations are completed by shutting the power switch off.

The system allows payload users to communicate continuously with their experiments without being subjected to the priorities of a space vehicles's main communication system. SHUCS provides a method for payload users to gather data and perform commanding that does not interfere with main communication system operations thus allowing the user to have continuous access to their experiment. SHUCS also allows payload users to work from a remote work site location, facilitating unmanned payloads and greatly reducing payload operational costs. The standard hardware and software interfaces significantly lower development costs as well as support Internet operations.

Although the VOICE system is designed to work independently of the main communication system of a space vehicle, for example the ISS Russian communication system, VOICE has a communication interface that allows data to be sent through the main communication system of a space vehicle, providing the ability to troubleshoot the VOICE system in the event that software modifications are required.

The invention has been described with reference to certain preferred embodiments thereof It will be understood, however, that modifications and variations are possible within the scope of the appended claims.

What is claimed is:

1. A secondary universal communication system for a payload element located with a space vehicle which operates independently of a main communication system on the space vehicle, the secondary universal communication system comprising:

an antenna unit;

a transmitter/receiver unit, that is coupled to the antenna unit and to the payload element, for providing direct communication of data between the payload element and at least one of a ground station, another space vehicle, and an orbiting space station via the antenna unit without utilizing the main communication system of the space vehicle.

2. A secondary universal communication system as claimed in claim 1, further comprising a voice unit coupled to the payload element, wherein the data communicated by the transmitter/receiver unit includes voice data.

3. A secondary universal communication system as claimed in claim 1, further comprising a video unit coupled to the payload element, wherein the data communicated by the transmitter/receiver unit includes image data.

* * * * *